United States Patent Office 3,159,600
Patented Dec. 1, 1964

3,159,600
REACTION PRODUCT OF HYDROXY SILOXANES AND POLYALKYLENIMINES
Nathaniel L. Watkins, Jr., Maplewood, Minn., assignor to Minnesota Mining and Manufacturing Company, St. Paul, Minn., a corporation of Delaware
No Drawing. Filed Oct. 13, 1960, Ser. No. 62,338
7 Claims. (Cl. 260—46.5)

This invention relates to a new composition of matter and the method of making same. In one aspect, this invention relates to new resinous compositions containing silicon. In another aspect, this invention relates to curing or crosslinking of silicon containing polymers.

Silicon containing organic materials have been known for some time. The silicanes, including polysiloxanes and polysilazanes, are noted in the art for various uses involving their non-adhesive properties. In addition, these silicanes are noted for their incompatibility with other materials and this characteristic has been utilized in various uses of the silicanes. However, as a result of the non-compatibility and non-adhesive properties of the silicanes, treatment of the silicanes with other coreactants has been severely limited. For example, curing of low molecular weight polysiloxanes to produce higher molecular weight materials of a resinous nature has been difficult because the polysiloxanes are incompatible with many curing agents. Moreover, curing agents which might be used with the polysiloxanes must be used at relatively high temperatures which is of a disadvantage to both the curing reaction as well as the substrate to which the material is to be applied. It is, therefore, highly desirable to provide a coreactant with the silicanes which is compatible therewith and which as a result of the coreaction with the silicanes results in a product of modified characteristics of a desirable nature.

The object of this invention is to provide a new silicon containing organic material.

Another object of this invention is to provide a new copolymer of a silicane.

Still another object of this invention is to provide a new cured or cross-linked composition containing silicon.

Another object of this invention is to provide a new fabric coating composition and fabrics coated therewith.

Yet another object of this invention is to provide a process for reacting silicanes.

Another object of this invention is to provide a process for cross-linking or curing silicanes, such as polysiloxanes.

Various other objects and advantages will become apparent to those skilled in the art from the accompanying description and disclosure.

In accordance with this invention, a silicane containing an active hydrogen is reacted with a polyalkylenimine to produce a reaction product of higher molecular weight. In one aspect, the invention comprises reacting a polysiloxane with a polyalkylenimine to produce a high molecular weight resinous material which is useful for coating surfaces. The resulting product has excellent solvent resistance and heat resistance and is transparent to visible light. In addition, the products of reaction are relatively insensitive to moisture and can be produced in the form of molded or extruded articles, films, tubing, etc.

The silicane reactant of this invention is an organic compound having a silicon atom in the skeletal chain and having attached to the silicon atom an alkylene or phenylene radical terminated by an active hydrogen group, such as a carboxyl group, an amine group, a mercaptyl group, or a hydroxyl group. The reactivity of the active hydrogen groups are in the order of decreasing activity as listed above. The preferred active hydrogen-containing group is thus the carboxyl group with the amine group the next preferred. The hydroxyl group is preferably in the form of a phenolic hydroxyl. The active functional group attached to the silicon atom may be represented by the following radical:

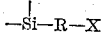

in which R is an alkylene radical having preferably between one and eight carbon atoms, usually not more than four carbon atoms, or a phenylene radical; and X is an active hydrogen-containing group as listed above.

The silicanes of this invention include the monomeric units themselves as well as polymers prepared therefrom, such as the polysiloxanes and the polysilazanes. The polymers of the silicanes include both the homopolymers and copolymers thereof. For example, the silicane reactant includes the monomer, such as methyl-beta-carbethoxylpropyl diethoxysilane, or the polymers thereof of either low or high molecular weight. For example, the above silane may be polymerized to produce the cyclic tetramer or may be further reacted from the cyclic tetramer in the presence of an alkali hydroxide at an elevated temperature between about 50 and 150° C. to produce a higher molecular weight polymer. The silane, the tetramer or the higher molecular weight polymer of the tetramer may be reacted with the polyalkylenimine to produce a suitable reaction product in accordance with the present invention. The silane may be reacted with another silane to produce a copolymer therewith. The silane comonomer may or may not contain a functional group of the nature above described. For example, methyl-beta-carbethoxylpropyl diethoxysilane may be reacted with dimethyl diethoxysilane or with methyl-beta-aminopropyl diethoxysilane. These products, formed by the polymerization of two different silanes, are then further reacted with the polyalkylenimine in accordance with this invention.

Suitable silicanes which include active hydrogen-containing groups and which may be utilized as a coreactant with the polyalkylenimine or may be homopolymerized or copolymerized with each other and the polymer product reacted with the polyalkylenimine include the following: methyl - beta - carbethoxylpropyl diethoxysilane, methylphenol - 4 diethoxysilane, methyl-beta-aminopropyl diethoxysilane, methyl-beta-mercaptoethyl diethoxysilane, methyl-delta-aminobutyl diethoxysilane, methyl-beta-carboxyethyl diethoxysilane, beta-carbethoxylpropyl triethoxysilane, and delta-aminobutyl triethoxysilane.

Silicanes which do not contain an active hydrogen functional group and which may be reacted with the above silicanes to produce polymers suitable for reaction with the polyalkylenimine include dimethyl diethoxysilane, dimethyl dichlorosilane, phenylmethyl diethoxysilane, diphenyl diethoxysilane, diphenyl dichlorosilane, diphenyl difluorosilane, diphenyl dibromosilane, diphenyl diiodosilane, diethyl diethoxysilane, diethyl dichlorosilane, methyl propyl diethoxysilane, or their cyclic condensation products.

The above silicanes containing no active hydrogen groups may in themselves be used to make a polymer which ultimately contains active hydrogen groups by polymerizing the silicane and subsequently oxidizing the polymer with chromic acid to produce carboxyl containing groups in the polymer.

A representative formula for the polysiloxanes containing the active hydrogen groups is as follows:

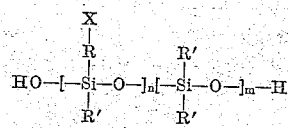

in which R is an alkylene radical having frome one to eight carbon atoms, preferably not more than four carbon atoms or a phenylene radical; X is an active hydrogen-containing group, such as a carboxyl group, an amine group, a mercaptyl group, or a hydroxyl group; R' is an organic radical terminated by an alkyl radical; and $n$ is 2 to 1,000 and $m$ is 0 to 1,000.

The two kinds of units making up the polysiloxane are normally copolymerized in a random manner. The active hydrogen atoms are spaced throughout the polymer chain, although non-random or block polymers are within the scope of the invention.

Preferably, the silicanes to be reacted with the polyalkylenimine contain at least two active hydrogen functional groups per molecule. In order to maintain a satisfactory pot life for the silicane reactant, a number of functional groups should be not more than about 15 per molecule. The preferred silicanes are the silicane polymers, such as the polysiloxanes, having a molecular weight between about 1,000 and about 15,000; however, polymers having a molecular weight up to 200,000 may be utilized in accordance with this invention.

As previously stated, the functional group of the silicanes must be attached to an alkylene radical rather than being attached directly to the silicon atom in order for it to be reactive enough to combine with the polyalkylenimine under normal reaction conditions.

The curing or cross-linking agents which may be employed in this invention are the polyalkylenimine (at least two alkylenimine radicals) of the formula:

where Q is an $n$ valent radical, $n$ is 2 to 4 (preferably 2 or 3), N is linked to an atom, such as carbon or phosphorous, having a valence of 4 or 5, and R' and R'' are hydrogen or an alkyl group preferably having from 1 to 4 carbon atoms. Q may be an aliphatic, aromatic or alicyclic organic radical which does not contain an active hydrogen but which may contain atoms other than carbon, such as oxygen, sulfur, etc. Q may also be an inorganic radical, such as

and

Such phosphorous-containing polyalkylenimine derivatives include, for example, tris(1-aziridinyl) phosphine oxide, tris(1-aziridinyl) phosphine sulfide, N,N-diethyl-N',N''-diethylenethiophosphoramide, N,N'-diethylenbenzene thiophosphondiamide, N-(3-oxapentamethylene) - N',N''-diethylene phosphoric triamide, N,N' - diethylenbenzene phosphondiamide, N,N'-diethylene ethane phosphondiamide, butyl N,N'-diethylenediamidophosphate, N,N-dioctyl-N',N''-diethylenephosphoric triamide, and N,N',N''-tris(1,1-dimethylethylene) phosphoric triamide, etc.

The preferred curing agents employed in preparing the polymers of the invention are the polyalkylenamides and the polyalkylenecarbamates respectively represented by the following illustrative formulae:

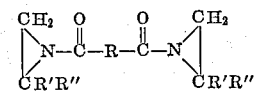

and

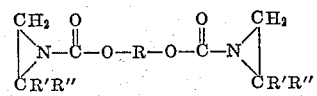

wherein R represents an organic radical, such as an alkylene radical having from 4 to 40 carbon atoms, a 1,3-phenylene radical or a 1,4-phenylene radical, and R' and R'' each represent hydrogen or an alkyl radical having from 1 to 8 carbon atoms, preferably not more than 4 carbon atoms.

The specific polyalkylenamide and carbamate curing agents included within the scope of the above formulae are characterized by properties which permit storage without spontaneous polymerization since they can be produced in substantially pure form, i.e. a product having an azirane ring content of at least 85 percent, usually at least 95 percent, of theoretical. They are controllably reactive and are especially useful for the purpose of chain extension of active hydrogen-containing silicanes as disclosed herein.

Among the N,N'-bis-1,2-alkylenamides useful as curing agents in accordance with the invention are N,N'-bis-1,2-ethylenadipamide, N,N'-bis-1,2-ethylenipimelamide, N,N'-bis - 1,2 - ethylenisosebacamide; N,N' - bis - 1,2 - butylenisosebacamide; N,N'-bis-1,2-ethylensebacamide; N,N'-bis-1,2-ethylensuberamide; N,N' - bis - 1,2-propylensuberamide; N,N' - bis - 1,2 - butylensuberamide; N,N' - bis-1,2 - ethylenazelaamide; N,N' - bis - 1,2 - propylenazelaamide; N,N' - bis - 1,2 - butylenazelaamide; N,N'-bis-1,2-ethylendodecanoyldicarboxylic acid amide; N,N' - bis-1,2 - ethylenetetradecanoyldicarboxylic acid amide; N,N' - bis - 1,2 - propylentetradecanoyldicarboxylic acid amide; N,N'-bis-1,2-ethylenhexadecanoyldicarboxylic acid amide; N,N'-bis-1,2-ethylenoctadecanoyldicarboxylic acid amide; N,N'-bis-1,2-propylenoctadecanoyldicarboxylic acid amide; N,N'-bis-1,2-propylendodecanoyldicarboxylic acid amide; and N,N'-bis-1,2-pentylensebacamide; N,N'-bis-1,2-ethylenisophthalamide; N,N'-bis-1,2-butylenisophthalamide; N,N' - bis - 1,2-propylenisophthalamide; N,N'-bis-1,2-pentylenisophthalamide; N,N'-bis-1,2-ethylenterephthalamide; N,N'-bis-1,2-propylenterephthalamide; N,N' - bis - 1,2-butylenterephthalamide; etc. Mixtures of these monomers may be produced by employing mixed 1,2-alkylenimines.

The N,N'-bis-1,2-alkylenamide curing agents are prepared in monomeric form by the following process: a 1,2-alkylenimine, desirably containing not more than 6 carbon atoms, such as ethylenimine, 1,2-propylenimine, 1,2-butylenimine, 1,2-pentylenimine, etc., is reacted with an aliphatic dicarboxylic acid chloride containing 8 to 20 carbon atoms, e.g. isosebacoyl dichloride, sebacoyl dichloride, suberoyl dichloride, azelaoyl dichloride, tetradecanoyl dichloride, dodecanoyl dichloride, hexadecanoyl dichloride and octadecanoyl dichloride, isophthaloyl chloride or terephthaloyl dichloride; to produce the desired substantially pure N,N'-bis-1,2-alkylenamide monomer, with hydrogen chloride as a by-product. The 1,2-alkylenimine is employed in a ratio of about 2 moles for each mol of acid chloride. Advantageously, an excess of 1,2-alkylenimine, such as about 5 percent by weight, over and above this ratio may be employed, although an excess of up to about 25 percent may be employed.

Desirably, the 1,2-alkylenimine is introduced in an aqueous solution which also contains an alkali metal carbonate, such as sodium, potassium, or lithium carbonate, which acts as an acid-acceptor to neutralize the hydrogen chloride formed during the reaction of the process. When a higher 1,2-alkylenimine than 1,2-ethylenimine, i.e., one containing more than 2 carbon atoms, is employed, an alkali-metal bicarbonate, such as sodium, potassium, or lithium bicarbonate may be used as the acid-acceptor instead of a carbonate. This aqueous solution is intimately mixed with the carboxylic acid chloride dissolved in a substantially water-immiscible organic solvent which is chemically inert to both the reactants and the reaction products and in which the resulting N,N'-bis-1,2-alkylenamide is soluble. The N,N'-bis-1,2-alkylenamide monomer reaction product is then recovered in a relatively pure, stable state in high yield from the organic solvent, in which it collects as the reaction proceeds, by evaporating the solvent. By this process of producing the monomers any possibility of attack on and decomposition of the alkylenamide product by hydrogen chloride formed during the course of the reaction is effectively minimized.

In producing N,N'-bis-1,2-alkylenamides of 1,2-ethylenimine accordingly, pH control of the reaction mixture is more critical than where alkylenimines containing more than 2 carbon atoms are employed. Thus, in such cases it is important to employ an alkali-metal carbonate as the acid-acceptor in an amount sufficient to neutralize all of the hydrochloric acid formed during the reaction of the process and yet maintain the pH of the reaction mixture at about 8.5 or above. With 1,2-alkylenimines containing more than 2 carbon atoms, on the other hand, an alkali-metal bicarbonate may be employed instead of an alkali-metal carbonate as the acid-acceptor, so long as sufficient bicarbonate is present to neutralize all of the hydrochloric acid formed. This phenomenon is believed to be the consequence of the greater reactivity of ethylenimine when compared to those alkylenimines containing more than 2 carbon atoms. The prevention of decomposition of the bis-alkylenamide monomer by the hydrogen chloride formed during the process which this process provides is critical to the production of stable monomer product in useful amounts.

Illustrative of the bis-carbamates which are useful as curing agents in the present invention are: N,N'-bis-1,2-ethylene (1,4-butanediol) carbamate; N,N'-bis-1,2-propylene (1,4-butanediol) carbamate; N,N'-bis-1,2-butylene (1,4-butanediol) carbamate; N,N'-bis-1,2-ethylene (diethylene glycol) carbamate; N,N'-bis-1,2-butylene (diethylene glycol) carbamate; N,N'-bis-1,2-ethylene (triethylene glycol) carbamate; N,N'-bis-1,2-propylene (triethylene glycol) carbamate; N,N'-bis-1,2-butylene (triethylene glycol) carbamate; N,N'-bis-1,2-ethylene (polyethylene glycol-200) carbamate; N,N'-bis-1,2-ethylene (polyethylene glycol-400) carbamate; N,N' - bis - 1,2-ethylene (polyethylene glycol-1000) carbamate; N,N'-bis-1,2-propylene (polyethylene glycol-1000) carbamate; N,N'-bis-1,2-ethylene (polyethylene glycol-4000) carbamate; N,N'-bis-1,2-ethylene (polypropylene glycol-1025) carbamate; N,N'-bis-1,2-ethylene (polybutylene glycol-500) carbamate; N,N'-bis-1,2-ethylene [1,1'-isopropylidene-bis-(p-cyclohexanol)] carbamate; N,N'-bis-1,2-ethylene [1,1'-isopropylidene-bis-(p-phenylenoxy) di-2-propanol] carbamate; N,N'-bis-1,2-ethylene phenylenoxydiacetamide; N,N'-bis-1,2-ethylene phenylenoxy carbamate; N,N'-bis-1,2-ethylene-4,4'-bisphenyl carbamate; N,N'-bis-1,2-ethylene (1,1'-isopropylidene-bis-phenylene) carbamate; N,N'-bis-ethyleneresorcinol carbamate, etc. The preferred aromatic carbamates are represented by the above formula wherein R is 1,3-phenylene, 1,4-phenylene, 1,1'-isopropylidene-bis-phenylene, or 1,1'-isopropylidene-bis-(p-phenylenoxy) di-2-propanol. The preferred aliphatic carbamates are represented by the above formula wherein R is a branched or straight chain alkylene radical having from about 4 to about 40, preferably from about 4 to about 20, carbon atoms.

Generally, the preparation of the carbamates involves the reaction of a 1,2-alkylenimine in a water phase with a solution of a chlorocarbonate of a difunctional alcohol in a water immiscible organic solvent, in the presence of an acid acceptor, at a temperature between about —5° C. and 30° C., in a manner and under conditions as described with regard to the preparation of the polyalkylenamides.

Another subclass of polyalkylenimines is the trimesamides having the general formula:

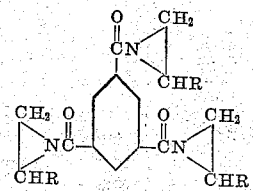

in which R is as previously defined. The trimesamides are prepared in the same manner and under the same conditions as the bis-alkylamides, as described hereinbefore, from an alkylenimine and an acid trihalide, such as trimesoyl trichloride. Examples of trimesamides include N,N',N''-tris-ethylenetrimesamide, N,N',N''-tris-2-propylethylenetrimesamide and N,N',N''-tris-2,2-dipropylethylenetrimesamide.

In the preparation of the cured compositions or copolymers of the invention, the active hydrogen-containing silicanes are usually employed in liquid form, and if solid may be warmed slightly to liquefy them. To the selected liquid silicane is then added the alkylenimine coreactant or curing agent which is to be employed. While an amount of the curing agent which is equivalent stoichiometrically to the number of active hydrogen groups present may be employed, and some desirable curing effects can be obtained with even smaller amounts, full cures are effected when amounts greater than stoichiometric amounts are employed, ranging upwards from 10 to 200 percent greater; and it is ordinarily preferred that about 50 to 100 percent excesses of the theoretical stoichiometric equivalent of the curing agent be used in order to compensate for any inerts in the curing agent, its adsorption on and reactivity with fillers, etc. The polymerization reaction or cure begins as soon as the two components are mixed. The rate of cure is dependent to a degree upon the temperature, the viscosity of the mixture and the amount of the curing agent which is employed. Obviously, by maintaining the mixture at low temperatures, for example, about 0–10° C., the polymerization is retarded and increased pot life is obtained.

If desired, fillers can be added to the composition before curing, as well as coloring pigments or organic dyes, such as the phthalocyanines, or other substances which may be considered as adjuvants and the like; for example, accelerators, such as triethylamine, antioxidants, such as phenothiazine, and catalysts, such as boron trifluoride. The finer fillers are good reinforcing agents for these systems, neutral fillers such as calcium carbonate, iron oxide and titanium dioxide being preferred. Acidic fillers such as certain carbon blacks and silicas can also be used if proper adjustments are made for pH (e.g. addition of increased amounts of bis-amide curing agent).

The reaction products of the silicane and the polyalkylenimine are useful for various purposes. The reaction products are useful as low adhesion backsize and release coatings. The electrical properties are of such nature that the products are useful as electrical insulators to be applied as varnishes and coatings on electrical conductors and electrical instruments. The products can be cast in a mold and cured to form articles of manufacture. Fiberglass reinforced laminates are also a useful field for the application of the present invention. The coating of fibers, such as Nylon and Orlon and woven fiberglass, for protective purposes is also an application to which the present system applies. The compositions of the present invention can be applied and cured on metal surfaces for use as primers and bonding agents. Such metal surfaces include aluminum, steel, and copper. Other uses for the cured composition of the present invention include electrical potting compositions, and as high temperature and optical resins.

The following examples are offered as a better understanding of the present invention and should not be construed as unnecessarily limiting the invention. The examples illustrate the preparation of the polyalkylenimine, the silicanes, and the curing of the silicanes.

EXAMPLE I

To a 2,000 ml. three-neck reaction flask equipped with a stirrer, a thermometer, a condenser and dropping funnel were added 110 grams of potassium carbonate, 800 grams of water and 43 grams of ethylenimine. The mixture was stirred until a solution was obtained which was then cooled to about 15° C. To the resulting solution was added dropwise with cooling and vigorous stirring a solution of about 95.6 grams of isosebacoyl dichloride prepared from "isosebacic acid" (a product of the U.S. Industrial Chemical Company consisting of 72–80% of 2-ethylsuberic acid, 12–18% of 2,4-diethyladipic acid and 6–10% of n-sebacic acid) dissolved in 400 ml. of diethyl ether. During this time the temperature of the mixture was maintained below 15° C. and the acid chloride added at a rate of approximately one gram per minute. The reaction mixture was allowed to warm gradually to room temperature, while stirring, for an additional hour. During the total reaction period, the pH of the reaction mixture dropped from approximately 12.5 at the beginning of the reaction to about 8.6 at the end. The ether layer was separated, dried over solid anhydrous sodium hydroxide at 0° C. for one hour, the sodium hydroxide removed by filtration and the ether removed from the filtrate under reduced pressure. The resulting reaction product, N,N'-bis-1,2-ethylenisosebacamide, remained as a water-white liquid. The yield was 93 grams or 93 percent of the theoretical. When subjected to analysis the product was found to contain 10.8% nitrogen and 33.3% azirane radical as compared with the calculated values of 11.1% and 33.3%, respectively.

EXAMPLE II

To a 1,000 ml. three-neck reaction flask equipped with a stirrer, a thermometer, a condenser and a dropping funnel were added 352 grams of a 5.5 percent by weight aqueous solution of ethylenimine containing 3.8 percent by weight of sodium hydroxide as an inhibitor. To this were added 28.1 grams of sodium bicarbonate (to convert the sodium hydroxide to sodium carbonate) and 10.6 grams of sodium carbonate. The mixture was stirred until all materials had dissolved. The solution was then cooled to 7° C. To the solution was then added 42 grams of isophthaloyl dichloride dissolved in 200 ml. of ethylene trichloride during which addition the mixture was cooled and stirred. During this addition the temperature was kept below 10° C. and the solution of isophthaloyl dichloride was fed into the reaction mixture at the rate of approximately 1 gram of isophthaloyl dichloride per minutes. The reaction mixture was permitted to warm gradually until it reached room temperature (21° C.) and stirred at room temperature for an additional three hours. The ethylene trichloride layer was separated and dried over anhydrous calcium sulfate, the calcium sulfate removed by filtration, and the ethylene trichloride solvent removed by distillation under vacuum. The reaction product, N,N'-bis-ethylenisophthalamide, remained as a white crystalline product melting at 76–78° C. The yield was 42 grams (98% of theoretical). The chlorine impurity content was less than 1 weight percent and the imine or azine ring content was above 95 weight percent.

Example III

Two polysiloxanes were prepared as follows and labeled polysiloxane A and polysiloxane B, respectively.

About 300 grams of methyl-delta-aminobutyl diethoxysilane were mixed with about 400 ml. of distilled water and stirred for 24 hours at room temperature (about 22° C.). Under these conditions the silane was polymerized to the tetramer. To the mixture containing the tetramer was then added the molecular equivalent of sodium hydroxide after which the resulting mixture was refluxed at about 100° C. for 2 hours. The reaction mixture was cooled, acidified with hydrochloric acid, and the organic layer and aqueous layer separated from each other. The organic layer was washed free of acid and stripped of volatiles. A light-colored liquid polymer remained corresponding to about 20 units of the monomer per molecule. The liquid polymer was designated polysiloxane A.

A liquid 1:1 copolymer of about 105 grams methyl-delta-aminobutyl diethoxysilane and about 7 grams of dimethyl diethoxysilane were prepared substantially in the same way as polysiloxane A. The resulting liquid copolymer contained an average of 40 monomeric units per molecule and was designated polysiloxane B.

Both polysiloxane A and polysiloxane B were separately reacted with polyalkylenamides in proportions and under the conditions shown in Table 1 below. These liquid polysiloxanes react with polyalkylenamide curing agents at room temperature (22° C.), setting up to a hard gel in less than one-half hour, and assume a rigid duplication of the contour of the mold with less than 2 percent shrinkage.

*Table 1*

|  | (1) | (2) | (3) | (4) | (5) |
|---|---|---|---|---|---|
| Compositions (parts by weight): |  |  |  |  |  |
| Polysiloxane A | 67 | 67 | 67 | 67 | ------ |
| Polysiloxane B (1 amino: 1 vinyl) | ------ | ------ | ------ | ------ | 106 |
| N,N'-bis-1,2-ethyleniso-sebacamide | 126 | ------ | ------ | ------ | ------ |
| 80:20 mix—N,N'-bis-1,2-ethylenisosebacamide:N,N'-bis-1,2-ethyleniso-phthalamide | ------ | 123 | 61 | 92 | 122 |
| Cure Schedule: |  |  |  |  |  |
| Hrs. at R.T. (22° C.) | 16.0 | 0.5 | 0.16 | 0.25 | 0.25 |
| Hrs. at 200° F | 0.16 | 5.0 | 4.0 | 4.0 | 4.0 |
| Hrs. at 350° F | 3.5 | ------ | ------ | ------ | ------ |
| Rockwell Hardness | L56 |  |  |  |  |
| Tensile Strength, p.s.i. | 2,300 | 2,950 | 1,950 | 3,430 | 3,220 |
| Elongation, percent | 0 | 0 | 0 | 0 | 0 |
| Heat Distortion Temp. (Penetration) ° C | 42 | >225 | 220 | >250 | >250 |
| 1 mm.² contact surface Weight Loss 200 hrs. at 500° F., percent | ------ | 9.7 | 13 | 11.5 | 10.4 |
| Percent Water Swell, 96 hrs./180° F | 15 | 7.4 | 15 | 7 | 0 |
| Percent Swelling, 96 hrs./140° F.: |  |  |  |  |  |
| Acetone | ------ | 0 | ------ | ------ | ------ |
| Toluene | ------ | 0 | ------ | ------ | ------ |
| Benzene | ------ | 0 | ------ | ------ | ------ |
| Ethanol | ------ | 32 | ------ | ------ | NG |

ELECTRICAL PROPERTIES, SAMPLE (2)

|  | 25° C. | 60° C. |
|---|---|---|
| Dissipation Factor: |  |  |
| 60~ | .0162 | .0672 |
| 1,000~ | .0201 | .0442 |
| Dielectric Constant: |  |  |
| 60~ | 4.5 | 5.8 |
| 1,000~ | 4.35 | 5.25 |
| Volume Resistivity | 2×10¹³ | 3×10¹¹ |

As shown in Table 1, the resistance of the cured resin to solvents at elevated temperatures appears excellent. The electrical properties are also very good. Weight loss during 200 hours of aging at 500° F. for the resins was about 10 percent. The transparent cured resins have demonstrated excellent adhesion to aluminum surfaces when applied in an uncured state and cured in situ. The resins are thus useful for coating metal surfaces to act as protective barriers. The cured resins have also demonstrated good adhesion to various other resinous materials, such as polyesters, and thus are useful as intermediate primer coatings for applying other resins, such as polyesters, to various surfaces, such as metals and fabrics.

EXAMPLE IV

A mixture of 148.2 grams (1 mol) of dimethyl diethoxysilane, 241.4 grams (0.97 mol) of beta-carbethoxypropyl methyl diethoxysilane, and 500 ml. of distilled water was stirred for 24 hours at room temperature (22° C.). Following this 40 grams (1 mol) of sodium hydroxide were added and the mixture was refluxed at 100° C. for 2 hours in order to saponify the carbethoxy group. The reaction mixture was cooled, acidified with hydrochloric acid, and separated into organic and aqueous layers. The organic layer was washed free of acid and stripped of volatiles under vacuum while stirring. Final conditions: 99° C. at 40 mm. Hg. A light yellow resin remained. This was heated to 180° C. at 40 mm. Hg. for final removal of volatiles. Weight of the resin obtained—195 grams (theoretical—210 grams). Analysis: 271 grams per acid equivalent (theoretical 220). The resin was dissolved in acetone to 75% solids.

A mixture of 18 grams of the above siloxane solution and 7 grams of N,N'-bis-1,2-ethylenisosebacamide were made and coated immediately on unprimed Teflon (polytetrafluoroethylene) using a 12 mil orifice on the laboratory handspread coater. It was cured by drying 2 hours and 15 minutes in air followed by 20 minutes at 150° F. and 2 hours at 200° F. A pliable clear film of about 6 mil thickness was obtained.

EXAMPLE V

A copolymer of methyl-delta-aminobutyl diethoxysilane and diphenyl dihydroxysilane was prepared in a manner similar to that described in Example III above. The resulting copolymer was a liquid. This liquid copolymer was then admixed with about 1 part by weight of N,N'-bis-1,2-ethylenisosebacamide to 4 parts by weight of the liquid polymer and cured at 70° C. for 24 hours to produce a clear resinous plastic. The plastic is suitable for use as a coating or for the preparation of molded articles.

EXAMPLE VI

A carboxylphenyl silicone prepared from p-toluyl trichlorosilane by oxidation of the polymer thereof was admixed with N,N'-bis-1,2-ethylenisosebacamide in the weight ratio 7:1 and coated on alclad aluminum. The composition was cured to a hard continuous film which firmly adhered to the aluminum and served satisfactorily as a protective coating.

Various modifications and alterations of proportions of components may become apparent to those skilled in the art without departing from the scope of this invention.

Having described my invention, I claim:

1. A resinous reaction product of a polysiloxane having the formula

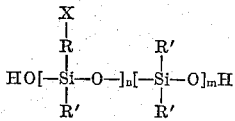

in which R is selected from the group consisting of an alkylene radical having from 1 to 8 carbon atoms and the phenylene radical, X is selected from the group consisting of carboxyl group, amine group, mercaptyl group and hydroxyl group, R' is selected from the group consisting of monovalent hydrocarbon radical and monovalent hydrocarbonoxy radical, $n$ is 2 to 1000 and $m$ is 0 to 1000 and a polyalkylenimine of the formula

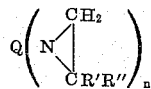

in which Q is n-valent radical selected from the group consisting of an organic radical linked to N through carbonyl groups and having at most oxygen other than carbon and hydrogen,

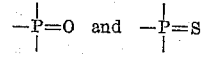

$n$ is 2 to 4, and R' and R" are selected from the group consisting of hydrogen and an alkyl group having from 1 to 4 carbon atoms.

2. The resinous reaction product of claim 1 in which the polysiloxane has a molecular weight between about 1000 and about 15,000.

3. A process which comprises reacting a polysiloxane having the formula

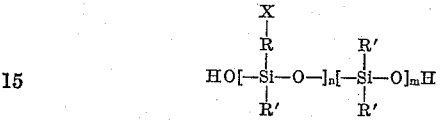

in which R is selected from the group consisting of an alkylene radical having from 1 to 8 carbon atoms and the phenylene radical, X is selected from the group consisting of carboxyl group, amine group, mercaptyl group and hydroxyl group, R' is selected from the group consisting of monovalent hydrocarbon radical and monovalent hydrocarbonoxy radical, $n$ is 2 to 1000 and $m$ is 0 to 1000 and a polyalkylenimine of the formula

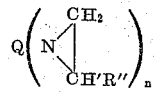

in which Q is n-valent radical selected from the group consisting of an organic radical linked to N through carbonyl groups and having at most oxygen other than carbon and hydrogen,

and

$n$ is 2 to 4, and R' R" are selected from the group consisting of hydrogen and an alkyl group having from 1 to 4 carbon atoms, at a temperature between about 10 and about 200° C.

4. A resinous reaction product of a (1) liquid polysiloxane of methyl-delta aminobutyl diethoxysilane and (2) N,N'-bis-1,2-ethylenisosebacamide.

5. A resinous reaction product of a (1) liquid copolysiloxane of methyl-delta aminobutyl diethoxysilane and (2) dimethyl diethoxysilane and N,N'-bis-1,2-ethylenisosebacamide.

6. A resinous reaction product of a (1) solid copolysiloxane of dimethyl diethoxysilane and beta-carbethoxypropyl methyl diethoxysilane and (2) N,N'-bis-1,2-ethylenisosebacamide.

7. A resinous reaction product of a (1) liquid copolysiloxane of methyl-delta-aminobutyl diethoxysilane and (2) diphenyl dihydroxysilane and N,N'-bis-1,2-ethylenisosebacamide.

References Cited in the file of this patent

UNITED STATES PATENTS 3,079,367　　Fram et al. _____ Feb. 26, 1963

UNITED STATES PATENT OFFICE
CERTIFICATE OF CORRECTION

Patent No. 3,159,600            December 1, 1964

Nathaniel L. Watkins, Jr.

It is hereby certified that error appears in the above numbered patent requiring correction and that the said Letters Patent should read as corrected below.

Column 7, line 54, for "azine" read -- azirane --; column 10, lines 25 to 28, the formula should appear as shown below instead of as in the patent:

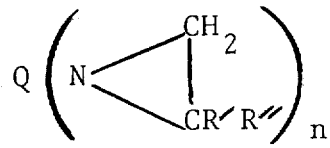

column 10, line 49, after "and", first occurrence, strike out "(2)", and insert the same after "and", second occurrence, same line 49, same column 10; column 10, line 57, before "diphenyl" strike out "(2)" and insert the same after "and", same line 57, same column 10.

Signed and sealed this 6th day of July 1965.

(SEAL)
Attest:

ERNEST W. SWIDER
Attesting Officer

EDWARD J. BRENNER
Commissioner of Patents